US009892647B2

(12) United States Patent
Papageorgiou et al.

(10) Patent No.: US 9,892,647 B2
(45) Date of Patent: Feb. 13, 2018

(54) ON-GROUND VEHICLE COLLISION AVOIDANCE UTILIZING SHARED VEHICLE HAZARD SENSOR DATA

(71) Applicant: Honeywell International Inc., Morris Plains, NJ (US)

(72) Inventors: George Papageorgiou, Haute Garonne (FR); Christophe Ceccom, Midi Pyrenees (FR)

(73) Assignee: Honeywell International Inc., Morris Plains, NJ (US)

(*) Notice: Subject to any disclaimer, the term of this patent is extended or adjusted under 35 U.S.C. 154(b) by 27 days.

(21) Appl. No.: 14/973,411

(22) Filed: Dec. 17, 2015

(65) Prior Publication Data

US 2017/0178520 A1 Jun. 22, 2017

(51) Int. Cl.
*G06F 17/00* (2006.01)
*G08G 5/04* (2006.01)
(Continued)

(52) U.S. Cl.
CPC ............. *G08G 5/04* (2013.01); *G08G 5/0013* (2013.01); *G08G 5/0021* (2013.01); *G08G 5/06* (2013.01); *G08G 5/065* (2013.01)

(58) Field of Classification Search
CPC .. G08G 5/04; G08G 5/06; G08G 1/16; G05G 5/0013; G01S 13/931; B60T 7/22; B60W 30/09; B60R 21/0314
(Continued)

(56) References Cited

U.S. PATENT DOCUMENTS 4,139,848 A * 2/1979 Maxwell, Jr. ........... G01S 17/87 342/30
6,118,401 A * 9/2000 Tognazzini ............... G01S 7/04 342/29
(Continued)

FOREIGN PATENT DOCUMENTS

EP 2892041 7/2015

OTHER PUBLICATIONS

Clark et al., "The Wingman—A Portable Wingtip Collision Avoidance System", Apr. 18, 2014, No. 1-53, Publisher: The University of Rhode Island.
(Continued)

*Primary Examiner* — Shardul Patel
(74) *Attorney, Agent, or Firm* — Fogg & Powers LLC

(57) ABSTRACT

Systems and methods for on-ground vehicle collision avoidance utilizing shared vehicle hazard sensor data are provided. In one embodiment, a system comprises: a ground based hazard data aggregation system comprising at least one memory storing a hazard position database; and at least one vehicle-ground communications electronics system coupled to the aggregation system; wherein the aggregation system is communicatively coupled to an onboard ground hazard collision avoidance system of at least a first on-ground subscriber vehicle through a wireless datalink established via the vehicle-ground communications electronics system; wherein the hazard position database stores vehicle collected hazard position data generated by a first on-ground contributing vehicle; and wherein the ground based hazard data aggregation system transmits to the first on-ground subscriber vehicle aggregated hazard position data from the hazard position database, the aggregated hazard position data including the vehicle collected hazard position data generated by the first on-ground contributing vehicle.

20 Claims, 5 Drawing Sheets

(51) Int. Cl.
*G08G 5/00* (2006.01)
*G08G 5/06* (2006.01)

(58) Field of Classification Search
USPC ............ 701/3, 9, 301; 342/30, 29; 340/961, 340/435, 901
See application file for complete search history.

(56) References Cited

U.S. PATENT DOCUMENTS

| | | | | |
|---|---|---|---|---|
| 7,379,165 | B2 * | 5/2008 | Anderson | B60Q 1/48 356/5.05 |
| 8,886,445 | B1 * | 11/2014 | Skoog | G08G 5/04 345/606 |
| 2004/0078123 | A1 * | 4/2004 | Igloi | B64F 5/60 701/31.4 |
| 2005/0134440 | A1 * | 6/2005 | Breed | B60N 2/2863 340/435 |
| 2007/0027655 | A1 * | 2/2007 | Schmidt | G05B 23/024 702/188 |
| 2008/0055149 | A1 * | 3/2008 | Rees | H01Q 1/28 342/29 |
| 2008/0062011 | A1 * | 3/2008 | Butler | G01S 3/783 340/961 |
| 2009/0276149 | A1 * | 11/2009 | Kauffman | G08G 5/0008 701/120 |
| 2010/0109936 | A1 * | 5/2010 | Levy | G08G 5/0013 342/30 |
| 2011/0276201 | A1 * | 11/2011 | Block | G08G 5/0086 701/9 |
| 2013/0110323 | A1 * | 5/2013 | Knight | G01S 13/93 701/3 |
| 2013/0321169 | A1 * | 12/2013 | Bateman | G08G 5/04 340/901 |
| 2014/0081567 | A1 * | 3/2014 | Kirk | G08G 5/04 701/301 |
| 2015/0051757 | A1 * | 2/2015 | Cox | B64D 45/00 701/3 |
| 2015/0170525 | A1 * | 6/2015 | Conner | G08G 5/065 701/3 |
| 2015/0193101 | A1 * | 7/2015 | Mannon | G01C 23/00 715/771 |
| 2016/0257429 | A1 * | 9/2016 | Szeto | G07C 5/008 |
| 2016/0328983 | A1 * | 11/2016 | Hutchinson | G08G 5/045 |

OTHER PUBLICATIONS

Jones, "Collision Avoidance for Airport Traffic", Oct. 9, 2007, pp. 1-13, Publisher: National Aeronautics and Space Administration.

Lacey, "WingWatch: Aircraft Ground Collision Avoidance System", Nov. 30, 2010.

Stevens et al., "Autonomous Collision Avoidance Final Design Report Cal Poly San Luis Obispo", Jun. 14, 2013, pp. i-116, Publisher: Avoidtronics.

Blasch, "UAV Following of Ground Vehicles for Airport Security—Abstract", "2013 IEEE/AIAA 32nd Digital Avionics Systems Conference (DASC)", Oct. 5, 2013, pp. 1.

Blasch et al., "Surveillance of Ground Vehicles for Airport Security", "Proceedings of SPIE—The International Society for Optical Engineering", Jun. 2014, pp. 1-12.

Blighter, "British Counter—UAV Technology (AUDS) Selected by FAA for US Airport Trials", "http://www.blighter.com/news/pressreleases/", May 31, 2016, pp. 1-3.

gloablsecurity.org, "V-22 Escort", "http://www.globalsecurity.org/military/systems/aircraft/v22escort.", Mar. 21, 2016, pp. 1-2.

GMU Motion and Shape Computing Group, "Tracking Using and Unmanned Aerial Vehicle (UAV)", "http://masc.cs.gmu.edu/wiki/UAV", Aug. 21, 2016, pp. 1-4.

Watson, "UAVs and Airports", "Eur Ing Michael Watson CEng MIET", 2015, pp. 1-28.

Pestana et al., "Vision Based GPS-Denied Object Tracking and Following for Unmanned Aerial Vehicles", "http://robotics.asu.edu/ardrone2_ibvs/", Aug. 21, 2016, pp. 1-10.

Rafi et al., "Autonomous Target Following by Unmanned Aerial Vehicles", "The International Society for Optical Engineering 6230", May 2006, pp. 1-8.

Researchgate, "How Do Airports and Airlines Use Drones (UAV, RPAS)?", "https://www.researchgate.net/post/How_do_airports_and_airlines_use_drones_UAV_RPAS", Aug. 21, 2016, pp. 1-3.

Teuliere et al., "Chasing a Moving Target from a Flying UAV", "French ANR national project SCUAV (ANR Psirob SCUAV project ref ANR-06-ROBO-0007-02", 2011, pp. 1-6.

William C. Selby, "Urban Convoy Escort Utilizing a Swarm of UAV's", "Trident Scholar Project Report No. 383 (2009)", May 4, 2009, pp. 1-168.

European Patent Office, "Partial European Search Report for EP Application No. 16203909.3", "Foreign Counterpart to U.S. Appl. No. 14/973,411", dated May 16, 2017, pp. 1-12, Published in: EP.

European Patent Office, "Extended European Search Report for EP Application No. 16203909.3", "Foreign Counterpart to U.S. Appl. No. 14/973,411", dated Aug. 21, 2017, pp. 1-10, Published in: EP.

* cited by examiner

ON-GROUND VEHICLE COLLISION AVOIDANCE UTILIZING SHARED VEHICLE HAZARD SENSOR DATA

BACKGROUND

Collisions that occur at airports between on-ground aircraft and other objects can result significant damage to aircraft. In addition to the airlines incurring expenses associated with repairing the aircraft, other expenses include the dispatch of a replacement aircraft and potential costs to accommodate displaced passengers. Existing efforts to address on-ground aircraft collisions typically involve the installation of collision avoidance sensors and systems on aircraft that enable an aircraft to autonomously detect potential collision hazards and warn the pilots of such hazards. However, these systems can be expensive and the costs associated with equipping each aircraft of an airline's fleet with such systems can be unattractive from a business perspective because of the relatively low rate of occurrence of such accidents, and because compared to in-flight collision accidents, the risk of loss of life due to airport on-ground collisions of taxing aircraft is nearly non-existent. Further, retrofitting aircraft not originally designed with such sensors can be both cost prohibitive as well as technologically challenging.

For the reasons stated above and for other reasons stated below which will become apparent to those skilled in the art upon reading and understanding the specification, there is a need in the art for improved systems and methods for improved on-ground aircraft collision avoidance systems.

SUMMARY

The Embodiments of the present invention provide methods and systems for providing on-ground aircraft collision avoidance systems utilizing shared aircraft hazard sensor data and will be understood by reading and studying the following specification.

In one embodiment, an on-ground collision avoidance system comprises a ground based hazard data aggregation system comprising at least one memory storing a hazard position database; and at least one vehicle-ground communications electronics system coupled to the ground based hazard data aggregation system; wherein the ground based hazard data aggregation system is communicatively coupled to an onboard ground hazard collision avoidance system of at least a first on-ground subscriber vehicle through a wireless datalink established via the vehicle-ground communications electronics system; wherein the hazard position database stores vehicle collected hazard position data generated by a first on-ground contributing vehicle; and wherein the ground based hazard data aggregation system transmits to the first on-ground subscriber vehicle aggregated hazard position data from the hazard position database, the aggregated hazard position data including the vehicle collected hazard position data generated by the first on-ground contributing vehicle.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

Figure 1:
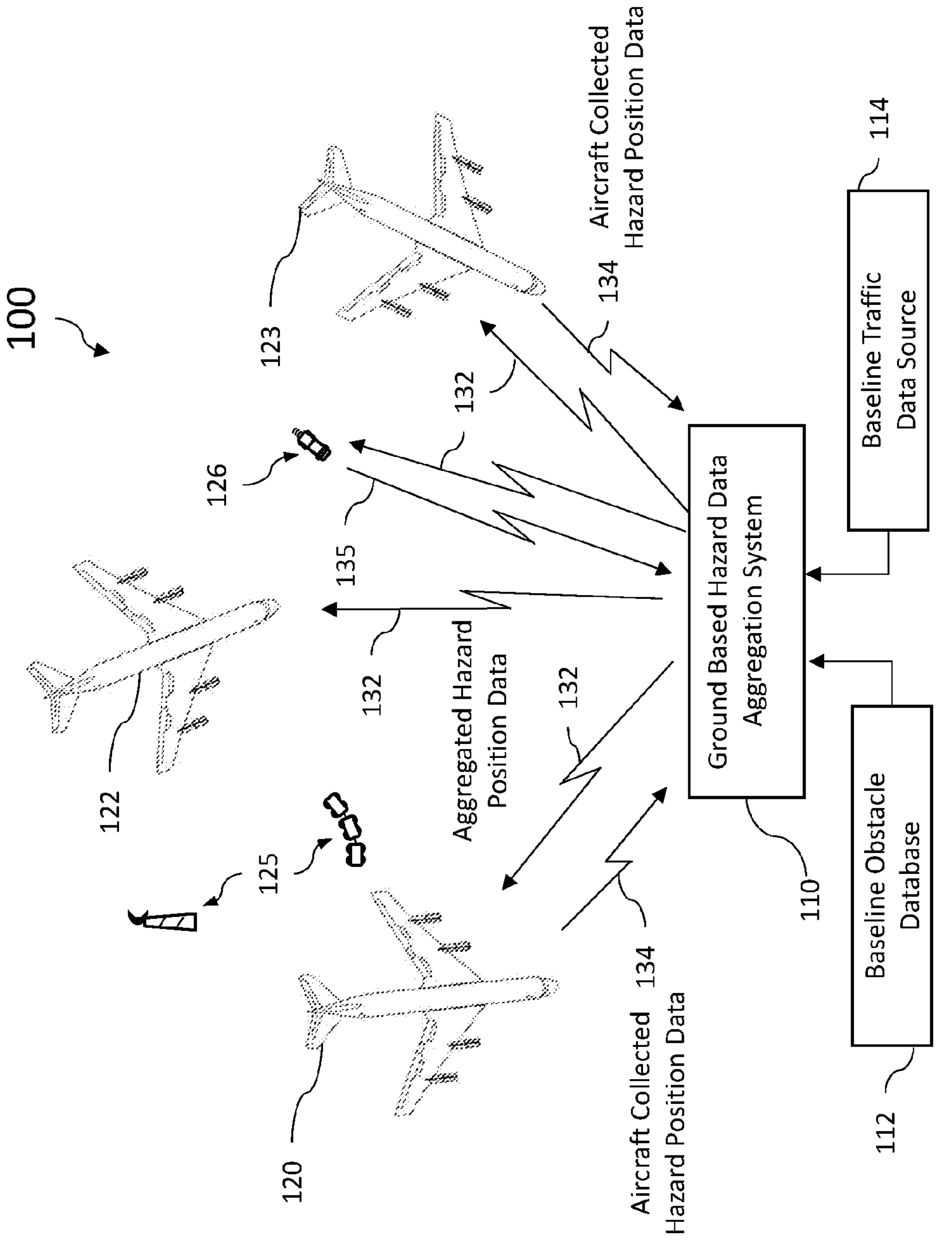
FIG. 1 is a diagram of an on-ground vehicle collision avoidance system of one embodiment of the present disclosure.

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

The present disclosure describes system and methods that address the issue of avoiding on-ground collisions between two vehicles, such as but not limited to aircraft, and between vehicles and moving or stationary hazards such as along airport taxiways, ramps and gate areas. More specifically, the embodiments of systems and methods described herein provide for on-ground vehicle collision avoidance by utilizing shared vehicle hazard sensor data. With these embodiments, vehicles such as aircraft and/or ground vehicles that have on-board collision avoidance sensors may dynamically share information regarding the location of detected on-ground airport hazards with other aircraft and/or ground vehicles. For example, using hazard position data shared by a second aircraft, the collision avoidance system of a first aircraft may be made aware of a hazard along the first aircraft's intended taxi route before the first aircraft would otherwise be made aware of the hazard by its own on-board sensors. Further, the first aircraft may benefit from hazard awareness developed from diverse equipment technologies. That is, given current airport environmental conditions, the first aircraft may be made aware of an upcoming hazard from shared aircraft hazard sensor data from the second aircraft that is captured using a sensor technology better suited to the current environmental conditions than the first aircraft's sensor technology. Still further, the first aircraft need not be equipped with any on-board collision avoidance sensors. In that case, the aircraft may instead rely only on shared hazard location data to avoid on-ground collisions. For example, an airline may elect to install on-board ground collision avoidance sensors on only a subset of its fleet knowing that there will be a sufficient number of aircraft present on an airport's taxiways and gate areas to provide a usably complete picture of where current airport hazards are located. Those aircraft without on-board ground collision avoidance sensors will still have the capacity to utilize hazard position data share by those that do. Inter-airline sharing of hazard position data can also be utilized by the first aircraft, for example, at an airport where that airline has few or infrequent flights. In some embodiments, rather than (or in addition to) peer-to-peer communication of hazard position data between aircraft, a ground based hazard data aggregation system is employed at an airport to receive hazard position data downlinks from aircraft with contributing onboard ground hazard collision avoidance systems. Data uplinks from that ground based hazard data aggregation system can then provide aggregated hazard position data to any aircraft at the airport that subscribes to that service.

FIG. 1 is a diagram illustrating an on-ground vehicle collision avoidance system 100 of one embodiment of the present disclosure utilizing shared vehicle hazard sensor data. Utilizing system 100, pilots of various vehicles (such as aircraft 120, 122 and/or 123) and/or operators of moving ground vehicles (such as truck 126) can be made aware of the position of various ground hazards (such as shown at 125 and 126). As further described below, ground hazards 125 and 126 may comprise passive (non-cooperative) or active (co-operative) obstacles, or ground traffic, or some combination thereof. System 100 comprises a ground based hazard data aggregation system 110 that includes datalink functionality to wirelessly transmit uplink data to vehicles and wirelessly receive downlink data from those vehicles. Such wireless datalink communications may be established, for example, using any available datalink technology such as, but not limited to, airport wireless LAN (e.g. WiFi), satellite communications (SATCOM), cellular data communications, and the like.

Vehicles having what is referred to herein as active onboard ground hazard collision avoidance systems (such as aircraft 120 and 123 and/or ground vehicle 126 for example) are equipped with on-board ground collision avoidance sensors and may elect to share hazard position data they have collected with the ground based hazard data aggregation system 110 (such as shown by Vehicle Collected Hazard Position Data downlinks 134). Vehicle with active systems that elect to share hazard position data are also referred to herein as hazard data contributing vehicles or aircraft vehicles. Vehicle that receive and utilize aggregated hazard position data transmitted by ground based hazard data aggregation system 110 are referred to herein as hazard data subscriber vehicles or aircraft. Hazard data subscriber vehicle (which include all three of aircraft 120, 122 and 123 in the example provided by FIG. 1) receive aggregated hazard position data uplinks 132 from the ground based hazard data aggregation system 110. As such, an aircraft, such as aircraft 120 and 123 in the example of FIG. 1, may be both a hazard data contributing vehicles and a hazard data subscriber vehicles. Alternatively, a vehicle such as aircraft 122, may be only a hazard data subscriber vehicle. A vehicle that is only a hazard data subscriber vehicle (i.e., not a contributing aircraft) may comprise an active onboard ground hazard collision avoidance system, but has elected not to share the hazard position data it collects with other vehicles. Alternatively, an aircraft that is only a hazard data subscriber vehicle may comprise what is referred to herein as a passive onboard ground hazard collision avoidance system that is not equipped with on-board ground collision avoidance sensors but instead has a ground hazard collision avoidance system that utilizes aggregated hazard position data uplinks to become aware of potential collision hazards.

As the term is used herein, a "hazard" may comprise one of several different types of objects. For example, one type of hazard comprises static objects referred to herein as "obstacles." The term obstacle may include static objects such as buildings, permanent gate equipment, airport equipment such as antennas or other sensors, construction equipment, or parked ground vehicles (i.e., airport vehicles parked in designated long-term parking location). Obstacles may comprise passive (or non-cooperative) obstacles that are not described in the airport's baseline obstacle database or do not actively communicate their presence as a hazard to other ground systems. For example, hazard 125 may comprise a non-cooperative hazard such as a stationary baggage cart or an airport antenna. Alternately, an obstacle may comprise an active (or cooperative) obstacle such as hazard 126. That is, hazard 126 is cooperative meaning that it may communicate its own presence as a hazard to other ground systems (via a wireless communication link such as shown at 135). FIG. 1 shows one example comprising a moving ground vehicle where hazard 126 is a baggage truck. Another type of hazard comprises dynamic objects referred to herein as "ground traffic" or simply "traffic". The term traffic encompasses moving ground vehicles in operation which may also receive ground based hazard data as further explained herein. It should be noted that in some implementations, a moving ground vehicle such as 126 may present a hazard to another vehicle (such as aircraft 122, for example) while also itself being a recipient of hazard position data to become aware of ground based hazards. As such, embodiments of systems comprising only non-aircraft vehicles sharing hazard data as described herein, or combinations of on-ground aircraft and non-aircraft vehicles sharing hazard data as described herein, are expressly contemplated.

Ground based hazard data aggregation system 110 comprises at least one processor coupled to a memory and compiles and stores hazard position data for both airport obstacles and traffic in a database. As updates to the database are received, those updates are transmitted to the subscribing vehicles as the aggregated hazard position data uplinks 132. The obstacle and the traffic hazard position data in the database of ground based hazard data aggregation system 110 can both be comprised of a combination of baseline and vehicle collected position data, which may be provided by one or more ground based hazard detection systems.

For example, in one embodiment, ground based hazard data aggregation system 110 is coupled to a baseline obstacle database 112 which includes permanent airport buildings and structures (for example, terminals, communications towers and equipment, hangers and other service buildings) and may change over extended periods, but not in the course of a day's operation. When incoming vehicle collected hazard position data from various aircraft simply indicates that airport's terminal and/or other service buildings and obstacles have not moved from their baseline positions, sharing of such information to subscribing vehicles should not be necessary since it is already captured in the baseline obstacle database. Similarly, in some embodiments, ground based hazard data aggregation system 110 may also be coupled to a source of baseline traffic data 114 (also referred to herein as baseline traffic data source 114). For example, the baseline traffic data from data source 115 may include Automatic Dependent Surveillance-Broadcast (ADS-B), Automatic Dependent Surveillance-Re-broadcast (ADS-R) traffic surveillance information, or Advanced Surface Movement Guidance & Control System (A-SMGCS) traffic surveillance information for aircraft and ground vehicles.

For example, in one implementation, the airport's ground traffic control system maintains a database of the current position of all managed ground traffic, which is accessed by ground based hazard data aggregation system 110 and incorporated into the aggregated hazard position data send to subscriber vehicles. Additional moving hazards sensed and reported by contributing vehicles in the vehicle collected hazard position data would be aggregated and by system 110 and also shared to subscriber vehicles via the uplinks 132.

Figure 2:
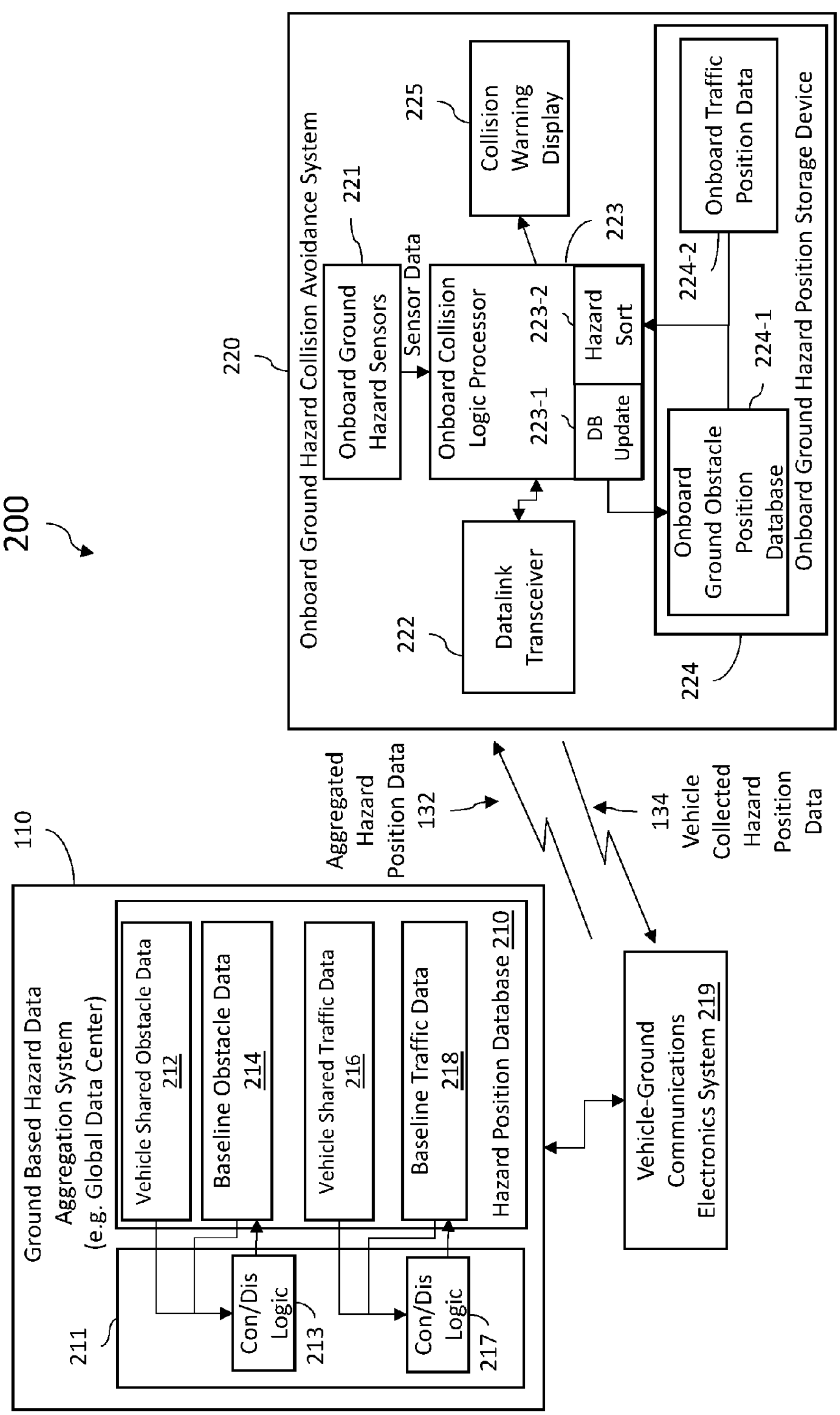
FIG. 2 is a diagram of a ground based hazard data aggregation system and an onboard ground hazard collision avoidance System of one embodiment of the present disclosure.

FIG. 2 provides another illustration at 200 of elements of the on-ground vehicle collision avoidance system 100 shown in FIG. 1. Ground based hazard data aggregation system 110 communicates with the onboard ground hazard collision avoidance system 220 installed on each of the aircraft 120, 122 and 123 via uplink datalinks 132 and downlink datalinks 134. Ground based hazard data aggregation system 110, which in some embodiments may be implemented by one or more processors 211 and/or as an element of a Global Data Center (GDC), stores hazard position data in a memory as a database 210 which may be shared with subscriber vehicles. Hazard position database 210 includes records of baseline obstacle data 214 (which may be aggregated from a Baseline Obstacle Database 112), Baseline Traffic Data 218 (which may be aggregated from a Baseline Traffic Data Source 114), and vehicle shared obstacle data (2142) and vehicle shared traffic data (216) obtained from Vehicle Collected Hazard Position Data downlinks 134. Ground based hazard data aggregation system 110 would also be coupled to vehicle-ground communications electronics 219 (for example, which may comprise air-ground communications electronics or other vehicle-ground communications electronics) to facilitate the datalink communications. In one embodiment, the one or more processors 211 may implement consolidate and discard logic (such as shown at 213 and 217) for one or both of the Baseline Obstacle Data 215 and Baseline Traffic Data 218.

Consolidate and discard logic 213 and 217 simplifies storage and communication of obstacle and traffic data by consolidating accumulated duplicate data and discarding accumulated stale data. That is, if duplicate data regarding what appears to be the same hazard is repeatedly reported, then that data may be consolidated by the logic 213, 217 and database 210 updated using the consolidated hazard position data for that object. Similarly if a sensed hazard has a last known position recorded in database 210 and that position information is not subsequently reconfirmed and/or updated, then that hazard position data may in fact become stale and no longer representative of the position of an actual hazard. In that case, for example after a number of update cycles or a pre-determined period of time elapses without that object being sensed, the logic 213, 217 can update database 210 by discarding the stale position data associated with the object.

For example, in one implementation consolidate and discard logic 213 inputs vehicle shared obstacle data 212 (which comprises, for example obstacle position data collected by on-vehicle sensors) and inputs obstacle position information from the baseline obstacle data 214 and processes those inputs together to output updates to the baseline obstacle data 214. Consolidate and discard logic 213 compares the vehicle shared obstacle data 212 with the baseline obstacle data 214 to identify duplicate instances of the same object and consolidate their corresponding position information. When information provided by the vehicle shared obstacle data 212 or baseline obstacle data 214 appears stale or no longer accurate consolidate and discard logic 213 can either discard the stale information or alternately refresh information in the baseline obstacle data 214 if freshly captured vehicle shared obstacle data 212 becomes available.

In a similar fashion, in one implementation consolidate and discard logic 217 inputs vehicle shared traffic data 216 (which comprises, for example traffic data collected by on-vehicle sensors) and inputs traffic position information from the baseline traffic data 218 and processes those inputs together to output updates to the baseline traffic data 218. In addition to vehicle sensor captured data, the baseline traffic data 218 may include Automatic Dependent Surveillance-Broadcast (ADS-B), Automatic Dependent Surveillance-Rebroadcast (ADS-R) traffic surveillance information, Advanced Surface Movement Guidance & Control System (A-SMGCS) traffic surveillance information for aircraft and ground vehicles. In one implementation, consolidate and discard logic 217 correlates the vehicle shared traffic data 216 with the baseline traffic data 218 to identify duplicate instances of the same object and consolidate their corresponding position information. Traffic hazards are expected to move over time so that the current vehicle sensed position of ground traffic hazards is correlated with the baseline traffic data 218 to associate the vehicle sensed ground traffic hazards with the corresponding associated ground traffic hazards listed in the baseline traffic data 218. When information provided by the vehicle shared traffic data 216 or the baseline traffic data 218 appears stale or no longer accurate, the consolidate and discard logic 217 can either discard the stale information or alternately refresh information in the baseline traffic data 218 if freshly captured vehicle shared traffic data 216 becomes available.

The onboard ground hazard collision avoidance system 220 includes one or more onboard ground hazard sensors 221, a datalink transceiver 222 (that communicates via datalinks 132 and 134), onboard collision logic processor 223, an onboard ground hazard position data storage device 224 and a collision warning display 225. Datalink transceivers 220 comprise the radio communications electronics that establish the datalinks 132 and 134 with the vehicle-ground communications electronics 219 used by ground based hazard data aggregation system 110. These datalinks may include, for example, SATCOM links, WiFi (i.e., IEEE 802.11) communications links, or cellular data communications links. The system 220 shown in FIG. 2 constitutes an active onboard ground hazard collision avoidance system because it includes onboard ground hazard sensors 221 which may be utilized to generate hazard position data that may be shared with Ground Based Hazard Data Aggregation System 110. Onboard ground hazard sensors 221 may comprise one or more object detections sensors known to those of skill in the art such as, but not limited to, LIDAR or RADAR sensors, visible spectrum cameras, infrared cameras, or Electro-Optical (EO)/Infrared (IR) Sensors, for example. Measurements from sensors 221 may be processed by onboard collision logic processor 223 into hazard position data which is stored in onboard ground hazard position data storage device 224. As shown in FIG. 2, onboard ground hazard position data storage device 224 may comprise an onboard ground obstacle position database 224-1 and a source of onboard traffic position data 224-2 (which may be stored in device 224 as a list, a database, or other format).

Onboard collision logic processor 223 continuously evaluates the position of known hazards identified in the onboard ground hazard position data storage device 224 against the vehicle's own position, and when the vehicle becomes within a threshold proximity of one of those hazards, onboard collision logic processor 223 alerts the flight crew via collisions warning display 225. When the onboard ground hazard collision avoidance system 220 is aboard a contributing vehicle, the hazard position data it collects will be transmitted to Ground Based Hazard Data Aggregation System 110 via a Vehicle Collected Hazard Position Data downlink 134.

As a subscriber vehicle, aggregated hazard position data uplinks 132 are received by the onboard ground hazard collision avoidance system 220, stored in onboard ground hazard position data storage device 224, and evaluated by onboard collision logic processor 223 in the same way as it processes its own generated hazard collection data. In one embodiment, onboard collision logic processor 223 may implement a database update function 223-1 that updates onboard ground obstacle position database 224-1 based on the aggregated hazard position data uplinks 132. That is, a hazard identified in the onboard ground hazard position data storage device 224 may have originated from another vehicle as vehicle collected hazard position data and communicated to the onboard ground hazard collision avoidance system 220 as aggregated hazard position data. Onboard collision logic processor 223 will evaluate the position of those hazards identified in the onboard ground hazard position data storage device 224 and alert the flight crew via collisions warning display 225 when the vehicle becomes within a threshold proximity of one of those hazards.

In one implementation, onboard collision logic processor 223 further implements a hazard sort function 223-2 that sorts out hazards sensed locally by that vehicle into obstacles verses ground traffic. In one implementation, prior to sorting, an upload of aggregated hazard position data over datalink 132 is initiated. Based on uploaded baseline data, sensed data, and sorting, onboard collision logic processor 223 generates the vehicle collected hazard position data that will be transmitted over via datalink 134 to the Ground Based Hazard Data Aggregation System 110. In one embodiment, the onboard ground obstacle position database 224-1 is synchronized with the baseline obstacle data 214. In one such embodiment, an output of locally sensed traffic position data from hazard sort function 223-2 is broadcast via datalink 134. In that case, onboard collision logic processor 223 may process the output of locally sensed obstacle position data from hazard sort function 223-2 and only broadcast (via datalink 134) differences in object positions it identifies between locally sensed obstacle position data and obstacle positions indicated by the baseline obstacle data 214.

For comparison, an embodiment for a passive ground based hazard data aggregation system 220 would not need to comprise the onboard hazard sensors 221, but could otherwise receive, process, and evaluate aggregated hazard position data in the same manner as an active system. In this manner, both vehicles with and without onboard ground hazard sensors can benefit from subscribing to the services provided by Ground Based Hazard Data Aggregation System 110. In some implementations, different subscription price points may be established for receiving aggregated hazard position data from system 100. For example a first (and potentially most expensive) price point may be established for aircraft that have an active onboard ground hazard collision avoidance system 220, but elect not to contribute aircraft collected hazard position data with other aircraft. A second midrange tier may be established for subscriber aircraft having a passive onboard ground hazard collision avoidance system 220. A third (and potentially least expensive) tier may be established for subscriber aircraft that are also contributing aircraft collected hazard position data. Additional discounts can be made, for example, to airlines that further contribute data such as information from Visual Docking Guidance Systems (VDGS).

Additionally, it should be appreciated that on-ground vehicle collision avoidance system 100 may further incorporate services for airplanes, helicopters and aerial drones as either subscriber or contributing vehicles, as well as processes position data of such aircraft as hazards themselves.

Figure 3:
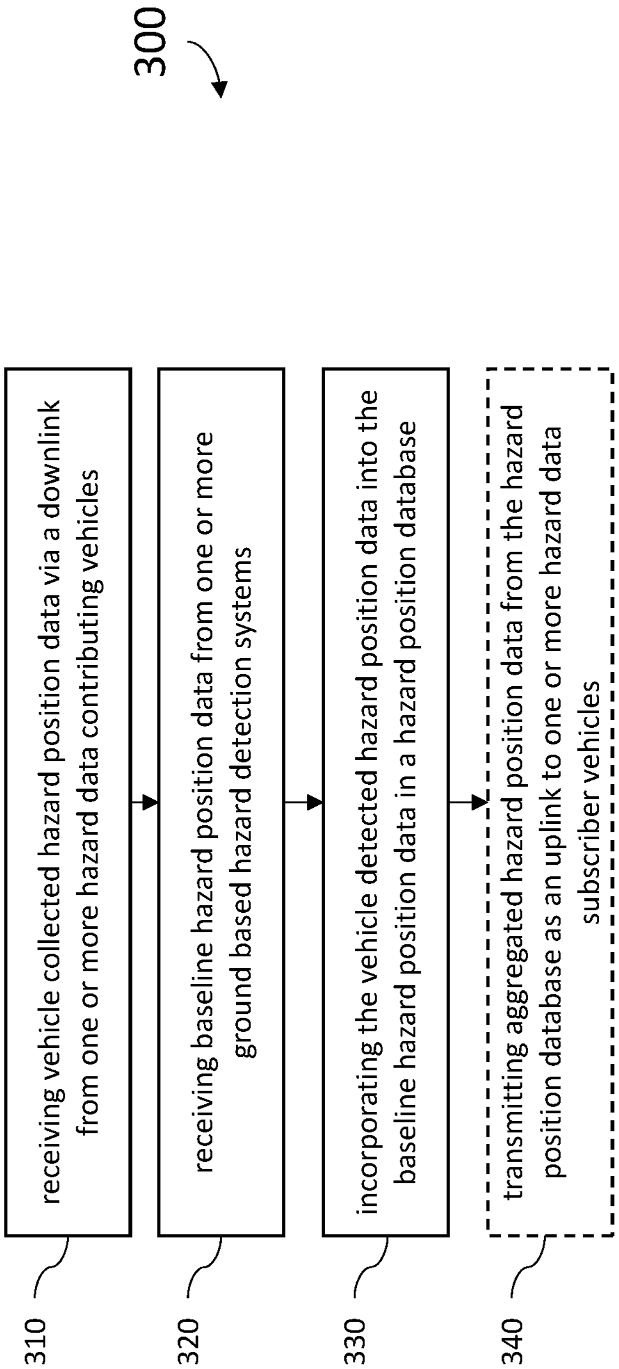
FIGS. 3, 3A and 3B are flow charts illustrating method embodiments of the present disclosure.
Figure 3A:
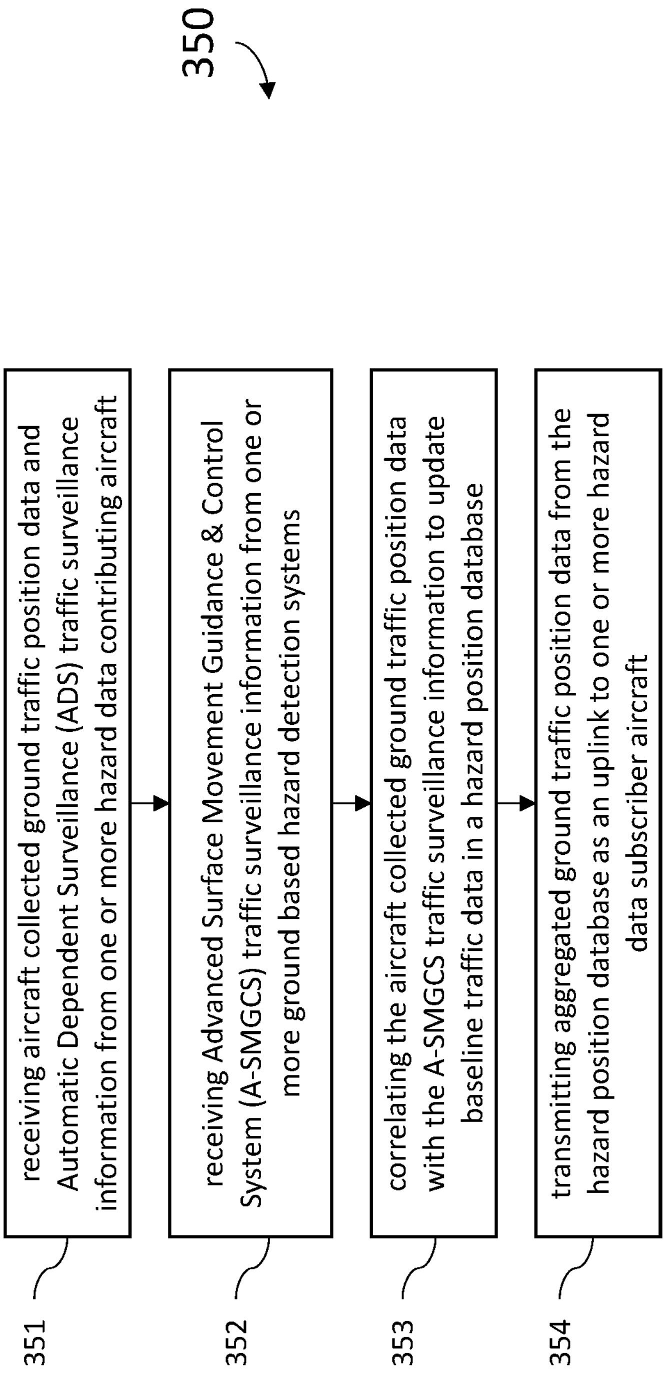
Figure 3B:
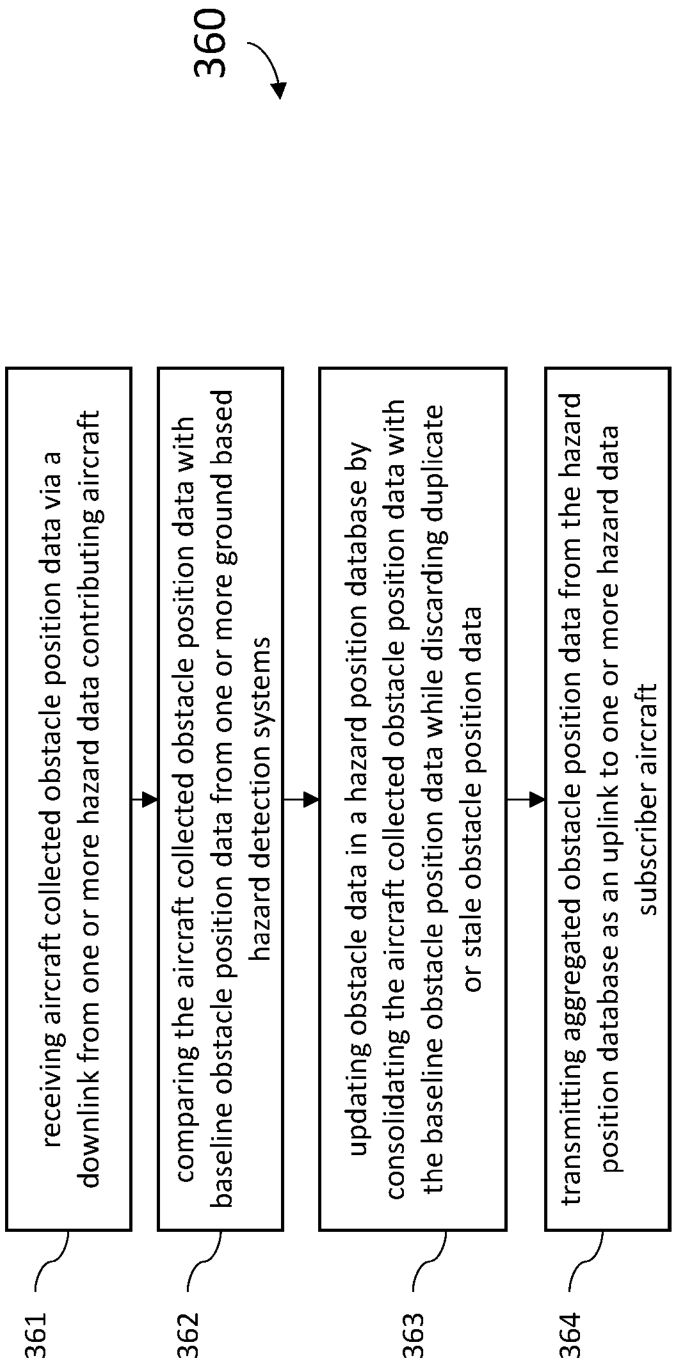

FIG. 3 is a flow chart illustrating a method 300 of one embodiment of the present invention. In FIG. 3, the term hazard may refer to either an obstacle or ground traffic, or both, as discussed in the figures above. FIG. 3A illustrates at method 350 one specific implementation of method 300 that focuses on a process for addressing ground traffic positions, while FIG. 3B illustrates at method 360 one specific implementation of method 300 that focuses on a process for addressing obstacle positions. It should be approached that components of either methods 350 or 360, or both, may be performed to implement elements of method 300. In at least one implementation, methods 300, 350 or 360 are implemented using any of the various implementations of system 100 embodiments described above. In some embodiments, methods 300, 350 or 360 may in whole or in part be implemented in combination or conjunction with any implementation or embodiment as described with respect to FIGS. 1 and 2 above. As such, the disclosures provided above with respect to like named elements above apply the methods 300, 350 or 360 and vise verse.

Method 300 begins at 310 with receiving vehicle collected hazard position data via a downlink from one or more hazard data contributing vehicles. For example, aircraft having active onboard ground hazard collision avoidance systems (such as aircraft 120 and 123, for example) are equipped with on-board ground collision avoidance sensors and may elect to share hazard position data they have collected with other aircraft either peer-to-peer or via a ground based hazard data aggregation system (such as system 110). Aircraft with active systems that elect to share hazard position data are referred to herein as hazard data contributing aircraft. Aircraft that receive and utilize aggregated hazard position data transmitted are referred to herein as hazard data subscriber aircraft. It should also be appreciated that method 300 may be implemented for ground vehicles other than on-ground aircraft.

The method proceeds to 320 with receiving baseline hazard position data from one or more ground based hazard detection systems. As explained above, obstacle and traffic hazard position data include a combination of both baseline and vehicle (e.g. aircraft) collected hazard position data. For example, in one embodiment, receiving baseline hazard position data may comprise receiving baseline obstacle data which includes the position of permanent airport buildings and structures (for example, terminals, communications towers and equipment, hangers and other service buildings). Similarly, in some embodiments, receiving baseline hazard position data may comprise may comprise receiving baseline traffic data that includes the current position of all currently managed ground traffic.

The method proceeds to 330 with incorporating the vehicle detected hazard position data with the baseline hazard position data in a hazard position database. The act of incorporating may include correlation of vehicle sensor collected traffic position data with baseline traffic data and updating the baseline traffic data (for example, such as described above with respect to the consolidate and discard logic 217). The act of incorporating may instead or further include comparing the vehicle shared obstacle data with the baseline obstacle data, for example, to identify duplicate instances of the same object and consolidate their corresponding position information (for example, such as described above with respect to the consolidate and discard logic 213). Duplicate information provided by the vehicle shared obstacle data may be discarded and not used to update the baseline obstacle data. Conversely, at block 330, information provided by the vehicle shared obstacle data which indicates that obstacle information in the baseline obstacle data is stale or no longer accurate may results in either discarding or updating information in the baseline obstacle data based on the freshly captured vehicle shared obstacle data. The resulting database would thus include both vehicle shared data received as vehicle collected position data downlinks and baseline data. The ground-based hazard position database 210 and the onboard ground hazard position data storage device 224 are both examples of such a hazard position database. In one embodiment where the method 300 is implemented by a ground Based Hazard Data Aggregation System (such as system 110), the method may proceed to 340 with transmitting aggregated hazard position data from the hazard position database as an uplink to one or more hazard data subscriber vehicle. In another embodiment, the elements 310, 320 and 330 of method 300 may instead be implemented on a vehicle by an onboard ground hazard collision avoidance system (such as system 220). In that case, the method may instead proceed with evaluating hazards identified in the hazard position database and alerting a flight crew when a hazard identified in the hazard position database is within a proximity threshold of an aircraft or other vehicle.

FIG. 3A illustrates at method 350 one example implementation of method 300 that focuses on a process for addressing ground traffic positions. The method begins at 351 with receiving aircraft collected ground traffic position data and Automatic Dependent Surveillance (ADS) traffic surveillance information from one or more hazard data contributing aircraft and proceeds to 352 with receiving Advanced Surface Movement Guidance & Control System (A-SMGCS) traffic surveillance information from one or more ground based hazard detection systems. As already discussed above, for the purpose of traffic position data processing, the method proceeds to 353 with correlating the aircraft collected ground traffic position data with the A-SMGCS traffic surveillance information to update baseline traffic data in a hazard position database. The method then proceeds to 354 with transmitting aggregated ground traffic position data from the hazard position database as an uplink to one or more hazard data subscriber aircraft.

FIG. 3B illustrates at method 360 one example implementation of method 300 that focuses on a process for addressing obstacle positions. The method begins at 361 with receiving aircraft collected obstacle position data via a downlink from one or more hazard data contributing aircraft and proceeds to 362 with comparing the aircraft collected obstacle position data with baseline obstacle position data from one or more ground based hazard detection systems. As already discussed above, for the purpose of object position data processing, the method proceeds to 363 with updating obstacle data in a hazard position database by consolidating the aircraft collected obstacle position data with the baseline obstacle position data while discarding duplicate or stale obstacle position data. The method the proceeds to 364 with transmitting aggregated obstacle position data from the hazard position database as an uplink to one or more hazard data subscriber aircraft.

Example Embodiments

Example 1 includes an on-ground collision avoidance system, the system comprising: a ground based hazard data aggregation system comprising at least one memory storing a hazard position database; and at least one vehicle-ground communications electronics system coupled to the ground based hazard data aggregation system; wherein the ground based hazard data aggregation system is communicatively coupled to an onboard ground hazard collision avoidance system of at least a first on-ground subscriber vehicle through a wireless datalink established via the vehicle-ground communications electronics system; wherein the hazard position database stores vehicle collected hazard position data generated by a first on-ground contributing vehicle; and wherein the ground based hazard data aggregation system transmits to the first on-ground subscriber vehicle aggregated hazard position data from the hazard position database, the aggregated hazard position data including the vehicle collected hazard position data generated by the first on-ground contributing vehicle.

Example 2 includes the system of example 1, the ground based hazard data aggregation system further coupled to at least one baseline obstacle database, wherein the hazard position database stores baseline obstacle data received from the baseline obstacle database; and wherein the aggregated hazard position data further includes obstacle position data from the baseline obstacle data.

Example 3 includes the system of any of examples 1-2, the ground based hazard data aggregation system further coupled to at least one baseline ground traffic database, wherein the hazard position database stores baseline ground traffic data received from the baseline ground traffic database; and wherein the aggregated hazard position data further includes ground traffic position data from the baseline ground traffic data.

Example 4 includes the system of any of examples 1-3, wherein the aggregated hazard position data includes position data for stationary obstacles and position data for ground traffic.

Example 5 includes the system of any of examples 1-4 further comprising the onboard ground hazard collision avoidance system of the first on-ground subscriber vehicle, wherein the onboard ground hazard collision avoidance system of the first on-ground subscriber vehicle comprises: an onboard collision logic processor; an onboard ground hazard position data storage device coupled to the onboard collision logic processor; a collision warning display coupled to the onboard collision logic processor; and at least one datalink transceiver communicatively coupled to the at least one vehicle-ground communications electronics system; wherein the onboard collision logic processor receives the aggregated hazard position data as an uplink from the ground based hazard data aggregation system and stores the aggregated hazard position data in the onboard ground hazard position data storage device; and wherein the onboard collision logic processor generates an alert on the collision warning display when the first on-ground subscriber vehicle becomes within a threshold proximity to a hazard identified by the vehicle collected hazard position data generated by the first on-ground contributing vehicle.

Example 6 includes the system of any of examples 1-5 further comprising an onboard ground hazard collision avoidance system of the first on-ground contributing vehicle, wherein the onboard ground hazard collision avoidance system of the first on-ground contributing vehicle comprises: an onboard collision logic processor; an onboard ground hazard position data storage device coupled to the onboard collision logic processor; one or more onboard ground hazard sensors coupled to the onboard collision logic processor; and at least one datalink transceiver communicatively coupled to the at least one vehicle-ground communications electronics system; wherein the onboard collision logic processor receives sensor data from the one or more onboard ground hazard sensors and stores hazard position data in the onboard ground hazard position data storage device based on the sensor data; and wherein the onboard collision logic processor generates the vehicle collected hazard position data from the sensor data and transmits the vehicle collected hazard position data to the ground based hazard data aggregation system via the at least one datalink transceiver.

Example 7 includes the system of any of examples 1-6, wherein the vehicle collected hazard position data generated by the first on-ground contributing vehicle comprises one of: data obtained from an aircraft mounted LIDAR device; data obtained from an aircraft mounted RADAR device; data obtained from an aircraft mounted infra-red imaging device; or data obtained from an aircraft mounted visual spectrum imaging device.

Example 8 includes the system of any of examples 1-7, wherein the ground based hazard data aggregation system processes raw sensor data received from the first on-ground contributing vehicle to generate at least part of the aggregated hazard position data.

Example 9 includes the system of any of examples 1-8, wherein either one or both of the first on-ground subscriber vehicle and the first on-ground contributing vehicle comprise either: an airplane; a helicopter; an aerial drone; or a ground vehicle.

Example 10 includes an onboard ground hazard collision avoidance system for an vehicle, the system comprising: an onboard collision logic processor; an onboard ground hazard position data storage device coupled to the onboard collision logic processor, the onboard ground hazard position data storage device including a ground obstacle position database and traffic position data; a collision warning display coupled to the onboard collision logic processor; and at least one datalink transceiver communicatively coupled to the at least one vehicle-ground communications electronics system; wherein the onboard collision logic processor receives aggregated hazard position data as an uplink from a ground based hazard data aggregation system and stores the aggregated hazard position data in the onboard ground hazard position data storage device, the aggregated hazard position data including vehicle collected hazard position data generated by at least one on-ground contributing vehicle; wherein the onboard collision logic processor generates an alert on the collision warning display when the vehicle becomes within a threshold proximity to a hazard identified by the vehicle collected hazard position data generated by the at least one on-ground contributing vehicle.

Example 11 includes the system of example 10, wherein the onboard collision logic processor is configured to sort data from the onboard ground hazard position data storage device into obstacle positions verses traffic positions.

Example 12 includes the system of example 11, wherein the onboard collision logic processor transmits to the ground based hazard data aggregation system, via the at least one datalink transceiver: the traffic position data; and ground obstacle position data not included in the received aggregated hazard position data.

Example 13 includes the system of any of examples 10-12, further comprising: one or more onboard ground hazard sensors coupled to the onboard collision logic processor; wherein the onboard collision logic processor receives sensor data from the one or more onboard ground hazard sensors and stores hazard position data in the onboard ground hazard position data storage device based on the sensor data; and wherein the onboard collision logic processor transmits a downlink comprising vehicle collected hazard position data to the ground based hazard data aggregation system via the at least one datalink transceiver, the vehicle collected hazard position data generated from the sensor data.

Example 14 includes the system of any of examples 10-13, wherein the one or more onboard ground hazard sensors comprises at least one of: a LIDAR device; a radar device; an infra-red imaging device; or a visual spectrum imaging device.

Example 15 includes the system of any of examples 10-14, wherein the aggregated hazard position data includes position data for stationary obstacles and position data for ground traffic.

Example 16 includes the system of any of examples 10-15, wherein the onboard collision logic processor is further configured to store in the onboard ground hazard position data storage device vehicle collected hazard position data received via a peer-to-peer datalink connection with the at least one on-ground contributing vehicle.

Example 17 includes the system of any of examples 10-16, wherein the at-least one on-ground contributing vehicle is a vehicle comprising either: an airplane; a helicopter; an aerial drone; or a ground vehicle.

Example 18 includes a method for on-ground collision avoidance, the method comprising: receiving vehicle collected hazard position data via a downlink from one or more hazard data contributing vehicles; receiving baseline hazard position data from one or more ground based hazard detection systems; and combining the vehicle detected hazard position data with the baseline hazard position data in a hazard position database; transmitting aggregated hazard position data from the hazard position database as an uplink to one or more hazard data subscriber vehicles.

Example 19 includes the method of example 18, wherein the one or more hazard data contributing vehicles and the one or more hazard data subscriber vehicles comprise aircraft, the method further comprising: receiving aircraft collected ground traffic position data and Automatic Dependent Surveillance (ADS) traffic surveillance information from the one or more hazard data contributing aircraft; receiving Advanced Surface Movement Guidance & Control System (A-SMGCS) traffic surveillance information from the one or more ground based hazard detection systems; correlating the aircraft collected ground traffic position data with the A-SMGCS traffic surveillance information to update baseline traffic data in the hazard position database; and transmitting aggregated ground traffic position data from the hazard position database as an uplink to the one or more hazard data subscriber aircraft.

Example 20 includes the method of example 18, wherein the one or more hazard data contributing vehicles and the one or more hazard data subscriber vehicles comprise aircraft, the method further comprising: receiving aircraft collected obstacle position data via a downlink from the one or more hazard data contributing aircraft; comparing the aircraft collected obstacle position data with baseline obstacle position data from the one or more ground based hazard detection systems; updating obstacle data in the hazard position database by consolidating the aircraft collected obstacle position data with the baseline obstacle position data while discarding duplicate or stale obstacle position data; transmitting aggregated obstacle position data from the hazard position database as an uplink to the one or more hazard data subscriber aircraft.

It should also be appreciate that onboard ground hazard collision avoidance system may be implemented using aircraft avionics systems, non-avionics on-board electronic equipment (such as laptop or tablet computers, for example), or a combination thereof. In various alternative embodiments, system elements, method steps, or examples described throughout this disclosure (such as the on-ground vehicle collision avoidance system, the Onboard Ground Hazard Collision Avoidance System, Onboard Collision Logic, Ground Based Hazard Data Aggregation System or sub-parts thereof, for example) may be implemented on one or more computer systems, field programmable gate arrays (FPGAs), or similar devices comprising a processor coupled to a memory and executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An on-ground collision avoidance system, the system comprising:
- a ground based hazard data aggregation system comprising at least one memory storing a hazard position database; and
- at least one vehicle-ground communications electronics system coupled to the ground based hazard data aggregation system;
- wherein the ground based hazard data aggregation system is communicatively coupled to an onboard ground hazard collision avoidance system of at least a first on-ground subscriber vehicle through a wireless datalink established via the vehicle-ground communications electronics system;
- wherein the hazard position database stores vehicle collected hazard position data generated by a first on-ground contributing vehicle, wherein the first on-ground contributing vehicle collects hazard position data about on-ground hazards detected by at least the first on-ground contributing vehicle using a vehicle mounted object detection sensor; and
- wherein the ground based hazard data aggregation system transmits to the first on-ground subscriber vehicle aggregated hazard position data from the hazard position database, the aggregated hazard position data including the vehicle collected hazard position data generated by the first on-ground contributing vehicle.

2. The system of claim 1, the ground based hazard data aggregation system further coupled to at least one baseline obstacle database, wherein the hazard position database stores baseline obstacle data received from the baseline obstacle database; and
- wherein the aggregated hazard position data further includes obstacle position data from the baseline obstacle data.

3. The system of claim 1, the ground based hazard data aggregation system further coupled to at least one baseline ground traffic database, wherein the hazard position database stores baseline ground traffic data received from the baseline ground traffic database; and
- wherein the aggregated hazard position data further includes ground traffic position data from the baseline ground traffic data.

4. The system of claim 1, wherein the aggregated hazard position data includes position data for stationary obstacles and position data for ground traffic.

5. The system of claim 1 further comprising the onboard ground hazard collision avoidance system of the first on-ground subscriber vehicle, wherein the onboard ground hazard collision avoidance system of the first on-ground subscriber vehicle comprises:
- an onboard collision logic processor;
- an onboard ground hazard position data storage device coupled to the onboard collision logic processor;
- a collision warning display coupled to the onboard collision logic processor; and
- at least one datalink transceiver communicatively coupled to the at least one vehicle-ground communications electronics system;
- wherein the onboard collision logic processor receives the aggregated hazard position data as an uplink from the ground based hazard data aggregation system and stores the aggregated hazard position data in the onboard ground hazard position data storage device; and
- wherein the onboard collision logic processor generates an alert on the collision warning display when the first on-ground subscriber vehicle becomes within a threshold proximity to a hazard identified by the vehicle collected hazard position data generated by the first on-ground contributing vehicle.

6. The system of claim 1 further comprising an onboard ground hazard collision avoidance system of the first on-ground contributing vehicle, wherein the onboard ground hazard collision avoidance system of the first on-ground contributing vehicle comprises:
- an onboard collision logic processor;
- an onboard ground hazard position data storage device coupled to the onboard collision logic processor;
- one or more onboard ground hazard sensors coupled to the onboard collision logic processor; and
- at least one datalink transceiver communicatively coupled to the at least one vehicle-ground communications electronics system;
- wherein the onboard collision logic processor receives sensor data from the one or more onboard ground hazard sensors and stores hazard position data in the onboard ground hazard position data storage device based on the sensor data; and
- wherein the onboard collision logic processor generates the vehicle collected hazard position data from the sensor data and transmits the vehicle collected hazard position data to the ground based hazard data aggregation system via the at least one datalink transceiver.

7. The system of claim 1, wherein the vehicle collected hazard position data generated by the first on-ground contributing vehicle comprises one of:

data obtained from an aircraft mounted LIDAR device;

data obtained from an aircraft mounted RADAR device;

data obtained from an aircraft mounted infra-red imaging device; or data obtained from an aircraft mounted visual spectrum imaging device.

8. The system of claim 1, wherein the ground based hazard data aggregation system processes raw sensor data received from the first on-ground contributing vehicle to generate at least part of the aggregated hazard position data.

9. The system of claim 1, wherein either one or both of the first on-ground subscriber vehicle and the first on-ground contributing vehicle comprise either:

an airplane;

a helicopter;

an aerial drone; or a ground vehicle.

10. An onboard ground hazard collision avoidance system for vehicle, the system comprising:

an onboard collision logic processor;

an onboard ground hazard position data storage device coupled to the onboard collision logic processor, the onboard ground hazard position data storage device including a ground obstacle position database and traffic position data;

a collision warning display coupled to the onboard collision logic processor; and at least one datalink transceiver communicatively coupled to the at least one vehicle-ground communications electronics system;

wherein the onboard collision logic processor receives aggregated hazard position data as an uplink from a ground based hazard data aggregation system and stores the aggregated hazard position data in the onboard ground hazard position data storage device, the aggregated hazard position data including vehicle collected hazard position data generated by at least one on-ground contributing vehicle, wherein the vehicle collected hazard position data comprises hazard position data collected for on-ground hazards detected by any on-ground contributing vehicle using a vehicle mounted object detection sensor;

wherein the onboard collision logic processor generates an alert on the collision warning display when the vehicle becomes within a threshold proximity to a hazard identified by the vehicle collected hazard position data generated by the at least one on-ground contributing vehicle.

11. The system of claim 10, wherein the onboard collision logic processor is configured to sort data from the onboard ground hazard position data storage device into obstacle positions verses traffic positions.

12. The system of claim 11, wherein the onboard collision logic processor transmits to the ground based hazard data aggregation system, via the at least one datalink transceiver:

the traffic position data; and ground obstacle position data not included in the received aggregated hazard position data.

13. The system of claim 10, further comprising:

one or more onboard ground hazard sensors coupled to the onboard collision logic processor;

wherein the onboard collision logic processor receives sensor data from the one or more onboard ground hazard sensors and stores hazard position data in the onboard ground hazard position data storage device based on the sensor data; and wherein the onboard collision logic processor transmits a downlink comprising vehicle collected hazard position data to the ground based hazard data aggregation system via the at least one datalink transceiver, the vehicle collected hazard position data generated from the sensor data.

14. The system of claim 10, wherein the vehicle mounted object detection sensor comprises at least one of:

a LIDAR device;

a radar device;

an infra-red imaging device; or a visual spectrum imaging device.

15. The system of claim 10, wherein the aggregated hazard position data includes position data for stationary obstacles and position data for ground traffic.

16. The system of claim 10, wherein the onboard collision logic processor is further configured to store in the onboard ground hazard position data storage device vehicle collected hazard position data received via a peer-to-peer datalink connection with the at least one on-ground contributing vehicle.

17. The system of claim 10, wherein the at-least one on-ground contributing vehicle is an vehicle comprising either:

an airplane;

a helicopter;

an aerial drone; or a ground vehicle.

18. A method for on-ground collision avoidance, the method comprising:

establishing a first wireless communication link between a ground based hazard data aggregation system and one or more hazard data contributing vehicles equipped with a vehicle-ground communications electronics system;

receiving at the ground based hazard data aggregation system vehicle collected hazard position data via a downlink from the one or more hazard data contributing vehicles, wherein the vehicle collected hazard position data comprises hazard position data collected for on-ground hazards detected by the one or more on-ground contributing vehicles using a vehicle mounted object detection sensor;

receiving at the ground based hazard data aggregation system baseline hazard position data from one or more ground based hazard detection systems; and combining the vehicle detected hazard position data with the baseline hazard position data in a hazard position database;

establishing a second wireless communication link between a ground based hazard data aggregation system and one or more hazard data subscriber vehicles with the vehicle-ground communications electronics system;

transmitting aggregated hazard position data from the hazard position database as an uplink to the one or more hazard data subscriber vehicles.

19. The method of claim 18, wherein the one or more hazard data contributing vehicles and the one or more hazard data subscriber vehicles comprise aircraft, the method further comprising:

receiving aircraft collected ground traffic position data and Automatic Dependent Surveillance (ADS) traffic surveillance information from the one or more hazard data contributing aircraft;

receiving Advanced Surface Movement Guidance & Control System (A-SMGCS) traffic surveillance information from the one or more ground based hazard detection systems;

correlating the aircraft collected ground traffic position data with the A-SMGCS traffic surveillance information to update baseline traffic data in the hazard position database; and transmitting aggregated ground traffic position data from the hazard position database as an uplink to the one or more hazard data subscriber aircraft.

20. The method of claim 18, wherein the one or more hazard data contributing vehicles and the one or more hazard data subscriber vehicles comprise aircraft, the method further comprising:

receiving aircraft collected obstacle position data via a downlink from the one or more hazard data contributing aircraft;

comparing the aircraft collected obstacle position data with baseline obstacle position data from the one or more ground based hazard detection systems;

updating obstacle data in the hazard position database by consolidating the aircraft collected obstacle position data with the baseline obstacle position data while discarding duplicate or stale obstacle position data;

transmitting aggregated obstacle position data from the hazard position database as an uplink to the one or more hazard data subscriber aircraft.

* * * * *